(12) United States Patent
Ablack et al.

(10) Patent No.: US 9,262,779 B2
(45) Date of Patent: Feb. 16, 2016

(54) DATA MANAGEMENT SYSTEM

(75) Inventors: Paul Ablack, Plymouth, MN (US); James A. Rohde, Fargo, ND (US)

(73) Assignee: OnApproach, LLC, Plymouth, MN (US)

(*) Notice: Subject to any disclaimer, the term of this patent is extended or adjusted under 35 U.S.C. 154(b) by 175 days.

(21) Appl. No.: 13/317,635

(22) Filed: Oct. 24, 2011

(65) Prior Publication Data

US 2013/0103722 A1    Apr. 25, 2013

(51) Int. Cl.
*G06Q 30/06* (2012.01)

(52) U.S. Cl.
CPC .................................. *G06Q 30/0603* (2013.01)

(58) Field of Classification Search
CPC ................................................. G06Q 30/0603
USPC .................................. 707/722–725
See application file for complete search history.

(56) References Cited

U.S. PATENT DOCUMENTS

| | | | | |
|---|---|---|---|---|
| 7,800,613 B2* | 9/2010 | Hanrahan et al. | ............. | 345/440 |
| 8,204,809 B1* | 6/2012 | Wise | ................................ | 705/35 |
| 2005/0096950 A1* | 5/2005 | Caplan et al. | ..................... | 705/7 |
| 2005/0222931 A1* | 10/2005 | Mamou et al. | .................. | 705/35 |
| 2005/0246357 A1* | 11/2005 | Geary et al. | ................. | 707/100 |
| 2006/0212486 A1* | 9/2006 | Kennis et al. | ................. | 707/200 |
| 2008/0162268 A1* | 7/2008 | Gilbert | ............................ | 705/10 |
| 2009/0138306 A1* | 5/2009 | Coburn et al. | ..................... | 705/7 |
| 2009/0322510 A1* | 12/2009 | Berger et al. | ............... | 340/539.1 |
| 2010/0094768 A1* | 4/2010 | Miltonberger | ................ | 705/325 |
| 2012/0010867 A1* | 1/2012 | Eder | ............................... | 703/13 |
| 2012/0066065 A1* | 3/2012 | Switzer | ..................... | 705/14.53 |
| 2012/0066217 A1* | 3/2012 | Eder | ............................ | 707/723 |
| 2012/0158633 A1* | 6/2012 | Eder | ............................... | 706/46 |

* cited by examiner

*Primary Examiner* — Shew-Fen Lin
*Assistant Examiner* — Navneet K Gmahl
(74) *Attorney, Agent, or Firm* — John F. Rollins

(57) ABSTRACT

A data model and associated systems and methods enable comprehensive and robust analysis based on a member-, employee-, and branch-centric data model. The data model is integrated in a manner in which common data entities for member, branch, employee and time, are related centrally to other data entities. This data structure enables breadth in reporting and analysis. The data model also provides depth in analysis and insight that may be gained from the data quickly, in real-time and without manual manipulation. Automation of reporting and analysis processes is also supported.

9 Claims, 24 Drawing Sheets

| Figure 5 |
|---|
| Figure 5A |
| Figure 5B |

Figure 5B

| | | | | | | | | | | | | |
|---|---|---|---|---|---|---|---|---|---|---|---|---|
| DIM_INVESTMENT | | | | X | | | | | | | | |
| DIM_INVESTMENT_MEMBER | X | X | | X | X | X | X | X | | | X | |
| DIM_INVESTMENT_PRODUCT_GROUP | | | | X | | | | | | | | |
| DIM_INVESTMENT_PRODUCT_TYPE | | | | X | | | | | | | | |
| DIM_INVESTMENT_REP | X | X | | X | X | X | X | X | | | X | |
| DIM_INVESTMENT_SALES_CHANNEL | | | | X | | | | | | | | |
| DIM_INVESTMENT_TYPE | | | | X | | | | | | | | |
| DIM_LOAN_ACCOUNT | | | X | | | | | | | | | |
| DIM_LOAN_ACCOUNT_TRAN | | | X | | | | | | | | | |
| DIM_LOAN_STATUS | | | X | X | | | | | | | | |
| DIM_MEMBER (100M) | X | X | X | X | X | X | X | X | | | X | |
| DIM_MEMBER_RISK_SCORE | X | | | | | | | | | | | |
| DIM_SHARE_ACCOUNT | | | | | X | | | | | | | |
| DIM_SHARE_ACCOUNT_TRAN | | | | | X | | | | | | | |
| DIM_SURVEY_MEMBERSHIP | | | | | | | | | X | | | |
| DIM_SURVEY_QUESTION | | | | | | | | | X | X | | |
| DIM_SURVEY_REAL_ESTATE | | | | | | | | | | X | | |
| DIM_TRANSACTION_TYPE | | X | | | | X | | | | | | X |

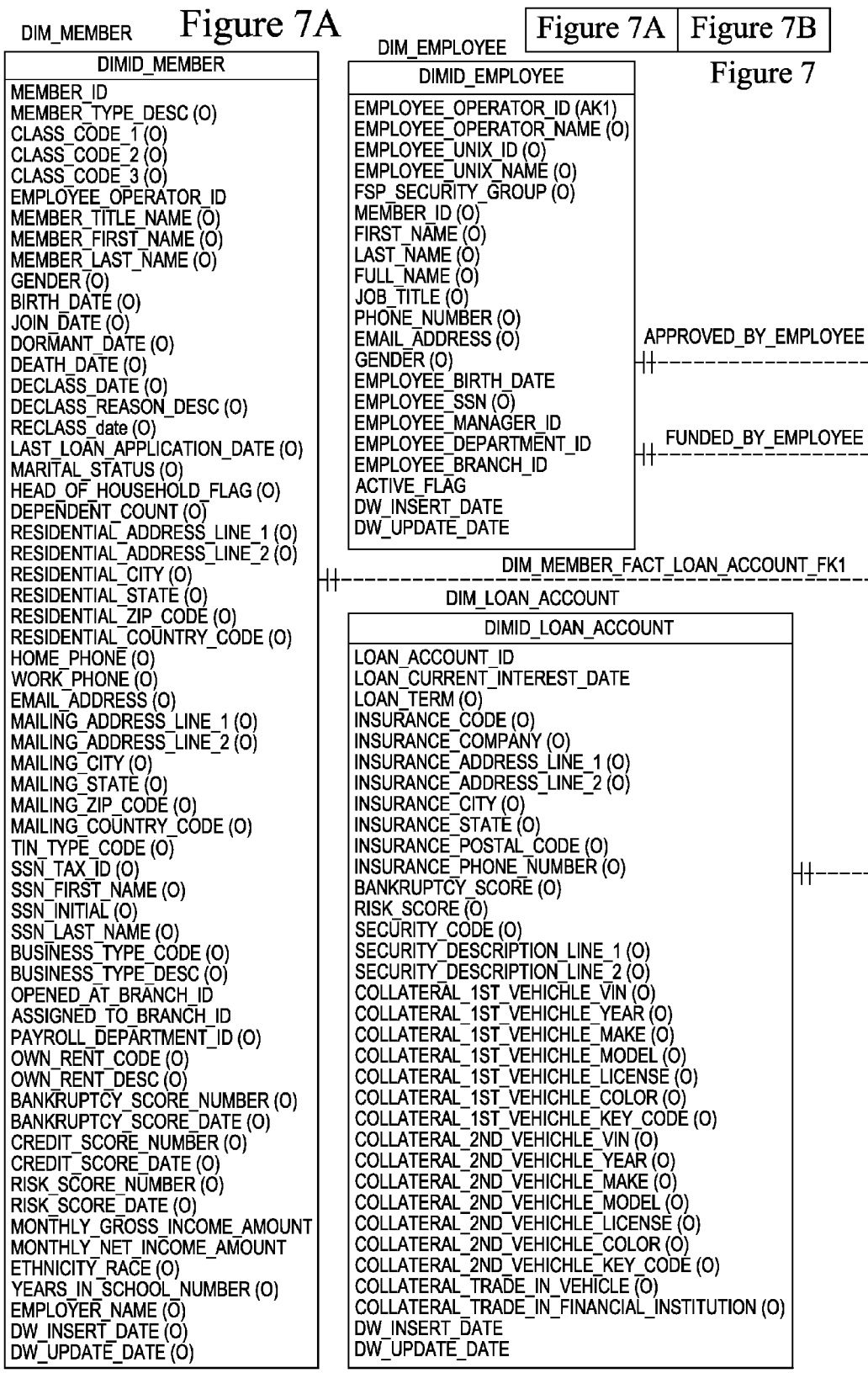

| 6. SSIS / Update Strategy | 7. DATAMARTS |
|---|---|
| | 1148 — MEMBER360_MARTS |
| | PCUONAS.MEMBER360_MARTS |
| LOAD_DIM_PSCU_ACCOUNT_IU.dtsx | DIM_PSCU_ACCOUNT |
| LOAD_DIM_PSCU_ACCOUNT_ACCUMULATOR_IU.dtsx | DIM_PSCU_ACCOUNT_ACCUMULATOR |
| LOAD_DIM_PSCU_ACCOUNT_DEMOGRAPHICS_IU.dtsx | DIM_PSCU_ACCOUNT_DEMOGRAPHICS |
| LOAD_DIM_PSCU_ACCOUNT_PROCESS_PARAMETER_IU.dtsx | DIM_PSCU_ACCOUNT_PROCESS_PARAMETER |
| LOAD_DIM_PSCU_ACCOUNT_SCORE_IU.dtsx | DIM_PSCU_ACCOUNT_SCORE |
| LOAD_DIM_PSCU_BONUS_IU.dtsx | DIM_PSCU_BONUS |
| LOAD_DIM_PSCU_CLIENT_DEFINED_SETTING_IU.dtsx | DIM_PSCU_CLIENT_DEFINED_SETTING |
| LOAD_DIM_PSCU_COLLECTION_IU.dtsx | DIM_PSCU_COLLECTION |
| LOAD_DIM_PSCU_CUSTOMER_IU.dtsx | DIM_PSCU_CUSTOMER |
| LOAD_DIM_PSCU_CUSTOMER_ACCOUNT_ROLE_IU.dtsx | DIM_PSCU_CUSTOMER_ACCOUNT_ROLE |
| LOAD_DIM_PSCU_CUSTOMER_ALTERNATE_ID_IU.dtsx | DIM_PSCU_CUSTOMER_ALTERNATE_ID |

Figure 11C

| 6. SSIS | 7. DATAMARTS |
|---|---|
| | MARTS —1250 |
| | [SERVER].MARTS |
| N/A | |
| N/A | |
| LOAD_MEMBER360_DIM_ACCOUNT_TYPE_IU.dtsx | DIM_ACCOUNT_TYPE |
| LOAD_MEMBER360_DIM_BRANCH_TYPE_IU.dtsx | DIM_BRANCH |
| LOAD_MEMBER360_DIM_CERTIFICATE_IU.dtsx | DIM_CERTIFICATE |
| LOAD_MEMBER360_FACT_CERTIFICATE_IU.dtsx | FACT_CERTIFICATE |
| LOAD_MEMBER360_DIM_CERTIFICATE_DETAIL_IU.dtsx | DIM_CERTIFICATE_DETAIL |
| LOAD_MEMBER360_FACT_CERTIFICATE_DETAIL_IU.dtsx | FACT_CERTIFICATE_DETAIL |
| | DIM_ |
| | DIM_ |
| | DIM_ |
| | DIM_ |
| | DIM_ |
| | DIM_ |
| | DIM_ |
| | DIM_ |
| | DIM_ |
| | DIM_ |
| | DIM_ |
| | DIM_ |
| | DIM_ |
| | DIM_ |
| | DIM_ |
| | DIM_ |
| | DIM_ |
| | DIM_ |
| | DIM_ |
| | DIM_ |
| | DIM_ |
| I = INSERT | |
| IU = INSERT / UPDATE | |
| TR = TRUNCATE / RELOAD | |

(1240 brackets the LOAD_MEMBER360_* rows)

Figure 12C

Automation - Attributes

| Attribute Type | Example | Benefit |
| --- | --- | --- |
| PK Integers | DIMID / FACTID | Faster SQL, reporting, and indexing |
| *Active Status | Member Active Flag | Quick determination of active/inactive members |
| *Data attributes | Member Join Date; Member Birth Date | Identify year, month, quarter, week, holiday, weekend, etc. characteristics for both calendars and fiscal dates |
| Code / Desc | Account Code / Desc; Transaction Type / Desc | Easily identify related text descriptions of numeric codes |

Figure 13

Automation - Transformations

| Transformation Type | Example | Benefit |
| --- | --- | --- |
| Member Number/Code/ID | Stored as text/char/number is source system; convert to consistent data type in target | Allows consistent user of member number across disparate sets of data. |
| NULL values / Unknown row | Transaction tables with missing data (i.e. branch, employee, date, etc) assigned as 'UNKNOWN' | Ensures all records are returned during a SQL statement without adding specific code |
| NULL $ amounts | Data mart assigns $0 to NULL values | Promises accuracy of SQL queries (i.e. averages, counts) |
| *Last Month, Last Year Balances | Calculates and stores last month and last year balances within the same data row | Increases reporting performance so SQL queries run once, rather than multiple times |
| *New columns | Source_File_Name | Ability for user to identify exact source location for a data record |
| New Tables | 0 = Not Delinquent; 30 = 1-30 days late | Customer-defined ranges create flexible reporting options |
| SSN cleanup | 123456789 to 123-45-6789 | Consistent display of data content |

Figure 14

| | Core 1210 | Loans 1220 | Credit Card 1230 | Credit Bureau 1240 | Additional Modules... 1250 |
|---|---|---|---|---|---|
| Member | ○ | ○ | ○ | ○ | ○ |
| Employee | ○ | ○ | ○ | ○ | ○ |
| Branch | ○ | ○ | ○ | ○ | ○ |
| Date/Time | ○ | ○ | ○ | ○ | ○ |
| Delinquency Category | N/A | ○ | ○ | N/A | ? |
| Risk Category | N/A | ○ | ○ | ○ | ? |
| Product Category | ○ | ○ | ○ | N/A | ? |

CREDIT UNION DASHBOARD

| ALL Branches ▷ | ALL Departments ▷ | ALL Employees ▷ |

MEMBER COMMITMENTS

COMMITMENTS

| Past Due | 215 |
| Due Today | 125 |
| Due Tomorrow | 260 |
| Due After Tomorrow | 743 |
| Unassigned | 64 |

Branch

| Past Due | 215 |
| Due Today | 125 |
| Due Tomorrow | 260 |
| Due After Tomorrow | 743 |
| Unassigned | 64 |

*1610*

ORGANIZATION

| Past Due | 215 |
| Due Today | 125 |
| Due Tomorrow | 260 |
| Due After Tomorrow | 743 |
| Unassigned | 64 |

OPPORTUNITIES

| Phone Follow-up | 142 |
| Open Loan Applications | 68 |
| Insurance Cross-Sell | 15 |
| Beat the Rate Loan | 92 |
| CD Maturity Renewal | 84 |

*1620*

COMPLIANCE / EXCEPTIONS

| Rate Exception | 7 |
| Term Exception | 12 |
| Due Date Change Exception | 4 |
| Invalid SSN | 26 |
| Credit Limit | 3 |
| Date Next Due | 15 |
| Missing Flood Certificate | 22 |

*1630*

OTHER

| GL Reconciliation | 53 |
| First Payment Default Loan | 29 |
| First Payment Default Credit Card | 42 |

| ACCOUNT TYPE CODE | I1,I10,I11,I12,I13,I14,I15, ▷ | | | APPROVED BY BRANCH NAME | Credit Union Branch 2 | ▷ | | | |
|---|---|---|---|---|---|---|---|---|---|
| FUNDED BY BRANCH NAME | Credit Union Branch 1 | ▷ | | | CATEGORY | 2nd Mortgage,Commercial Ser ▷ | | | |
| REPORT DAY | 3/13/2010 12:00:00 AM | ▷ | ~1810 | | | | | | |

|◁ ◁ 1 of 1 ▷ ▷|  100% ▷ |                              | Find | Next | Select a format ▷ | EXPORT | ↻ | 🖶 |

LOANS_DAILY_DETAIL

| MEMBER ID | LOAN ACCOUNT ID | LOAN OPEN DATE | LOAN CATEGORY | ACCOUNT TYPE CODE | ACCOUNT TYPE DESC | LOAN ORIGINAL BALANCE AMOUNT | LOAN CURRENT BALANCE AMOUNT | LOAN CURRENT INTEREST RATE | LOAN TERM | BANK RUPTCY SCORE | RISK SCORE | DOLLAR YIELD |
|---|---|---|---|---|---|---|---|---|---|---|---|---|
| 1111111 | 1111111.AA | 3/13/2010 | Vehicle | L3 | NEW VEHICLE- | $22,916.35 | -$22,916.35 | 5.25 | 72 | 670 | 670 | $1,203.11 |
| 2222222 | 2222222.BB | 3/13/2010 | Vehicle | L6 | USED VEHICLE- | $10,337.50 | -$10,337.50 | 4.75 | 48 | 801 | 801 | $491.03 |
| 3333333 | 3333333.CC | 3/13/2010 | Recreational Vehicle | L31 | MOTORCYCLES 750CC | $5,353.50 | -$5,353.50 | 6.85 | 48 | 749 | 749 | $366.71 |
| 4444444 | 4444444.DD | 3/13/2010 | Signature | L51 | SIGNATURE | $16,309.64 | -$16,309.64 | 10.75 | 48 | 756 | 756 | $1,753.29 |
| 4 | | | | | | $54,916.99 | -$54,916.99 | | | | | $3,814.14 |

Figure 18

Report: Manager Windows Internet Explorer http:// /Reports/Pages/Report.aspx?ItemPath=%2f CU+Reports%2f01_MemberDemographics%2fAttrition+by+Day%ExecId=

Report Manager

SQL Server Reporting Services
Home > CU Reports > 01 Member Demographics > ~1910
Attrition by Day

| View | Properties | History | Subscriptions | | | |
|---|---|---|---|---|---|---|
| | ◁ 1 of 1 ▷ ▷| 100% ▽ | | Find | Next | | | |

Attrition by Day    Active Flag: All    Year: Find Next    Select a format ▽ EXPORT
             Gender: All    Year: 2009

| Date¤ | Adds¤ | Loss¤ | Net¤¤ |
|---|---|---|---|
| 12/12/2009¤ | 17¤ | 1¤ | 16¤¤ |
| 12/14/2009¤ | 42¤ | 15¤ | 27¤¤ |
| 12/15/2009¤ | 32¤ | 14¤ | 18¤¤ |
| 12/16/2009¤ | 54¤ | 15¤ | 39¤¤ |
| 12/17/2009¤ | 31¤ | 15¤ | 16¤¤ |
| 12/18/2009¤ | 49¤ | 14¤ | 35¤¤ |
| 12/19/2009¤ | 11¤ | 0¤ | 11¤¤ |
| 12/21/2009¤ | 43¤ | 15¤ | 28¤¤ |
| 12/22/2009¤ | 35¤ | 18¤ | 17¤¤ |
| 12/23/2009¤ | 28¤ | 11¤ | 17¤¤ |
| 12/24/2009¤ | 13¤ | 17¤ | -4¤¤ |
| 12/26/2009¤ | 3¤ | 2¤ | 1¤¤ |
| 12/28/2009¤ | 63¤ | 29¤ | 34¤¤ |
| 12/29/2009¤ | 49¤ | 20¤ | 29¤¤ |
| 12/30/2009¤ | 36¤ | 17¤ | 19¤¤ |
| 12/31/2009¤ | 53¤ | 10¤ | 43¤¤ |
| | 955¤ | 528¤ | 427¤¤ |

DATA MANAGEMENT SYSTEM

BACKGROUND

1. Technical Field

This application relates to the field of data management systems. More specifically, the application relates to data management systems for managing data for financial institutions, such as credit unions.

2. Background Information

Managers of financial institutions may desire to quickly generate reports and gain insight from customer data to determine what types of transactions customers are conducting, how these transactions are trending, who their most profitable customers are within a given time period, and what products were purchased by these customers. They may want to understand the mix of their loan portfolio in terms of loan type and risk category and within a defined period of time. These and other insights may be advantageous in achieving business objectives, for banks and credit unions, for example, which typically have business objectives that include increasing loan originations, improving cash management, increasing marketing program yields, increasing productivity, or measuring compliance.

Traditional financial institution data management solutions are limited in the level of data insight and reporting capabilities they offer. Useful data may be available from various sources, including core applications and external data sources or applications. However, driving value from the data through integrated, comprehensive reporting and insight cannot be quickly accomplished since it usually requires a significant amount of manual effort, which may include manual extraction from applications and manually manipulating the data, using tools such as Microsoft Excel, into a desired form. There is thus a need for improved integration of data that supports more robust and comprehensive reporting and analytic capabilities.

Traditional systems also suffer from a lack of scalability. That is, financial institutions must often absorb significant costs of installing complex data management solutions upfront in order to have the data management capabilities required for future growth of their business. Moreover, any scalability provided in traditional systems is not usually tied to the value delivered to customers or members by the overall system. There is thus a need for a scalable data management system architecture, which allows financial institutions to increase capabilities in an economical manner tied to the value delivered to customers or members. There is an associated need for a data model, which facilitates such a scalable system architecture.

SUMMARY OF THE INVENTION

The invention provides a data model and associated systems and methods, which enable comprehensive and robust analysis based on a member-, employee-, branch-centric data model. More specifically, the exemplary data model is integrated in a manner in which common data entities for member, branch, employee and time, are related centrally to other data entities in the data model. This data structure enables breadth in reporting and analysis.

The data model also provides depth in analysis and insight that may be gained from the data quickly, in real-time and without manual manipulation. The invention also provides for comprehensive reporting for financial institutions, including credit unions.

The invention also provides improved automation of reporting and analysis processes. The breadth and depth of the data model provide for periodic updating of reports and analysis without the need for manual manipulation of the data. In addition, custom attributes, which support improved automation are provided within the data entities and transformed data entities are provided as part of the overall data model. Exemplary data models according to one aspect of the invention also facilitate scalability and a modular architecture for the overall data management system.

BRIEF DESCRIPTION OF THE DRAWINGS

The features and attendant advantages of the invention will be apparent from the following detailed description together with the accompanying drawings, in which like reference numerals represent like elements throughout. It will be understood that the description and embodiments are intended as illustrative examples and are not intended to be limiting to the scope of invention, which is set forth in the claims appended hereto.

FIG. 13 is a table listing data entity attributes which enable enhanced automation of a data management system according to the invention.

FIG. 14 is a table listing transformation data entities, which further support enhanced automation in a data management system according to the invention.

FIG. 16 illustrates a productivity insight user interface screen.

FIGS. 17 and 18 show loan insight user interface screens.

FIGS. 19 and 20 show additional reporting capabilities.

DETAILED DESCRIPTION OF THE PRESENT EMBODIMENTS

It will be understood, and appreciated by persons skilled in the art, that one or more processes, sub-processes, or process steps described in connection with the Figures included herewith may be performed by hardware and/or software. If the process is performed by software, the software may reside in software memory in a suitable electronic processing component or system such as, one or more of the functional components or modules schematically depicted in the Figures. The software in software memory may include an ordered listing of executable instructions for implementing logical functions (that is, "logic" that may be implemented either in digital form such as digital circuitry or source code or in analog form such as analog circuitry or an analog source such as analog electrical, sound or video signal), and may selectively be embodied in any computer-readable medium for use by, or in connection with, an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by, or in connection with, the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
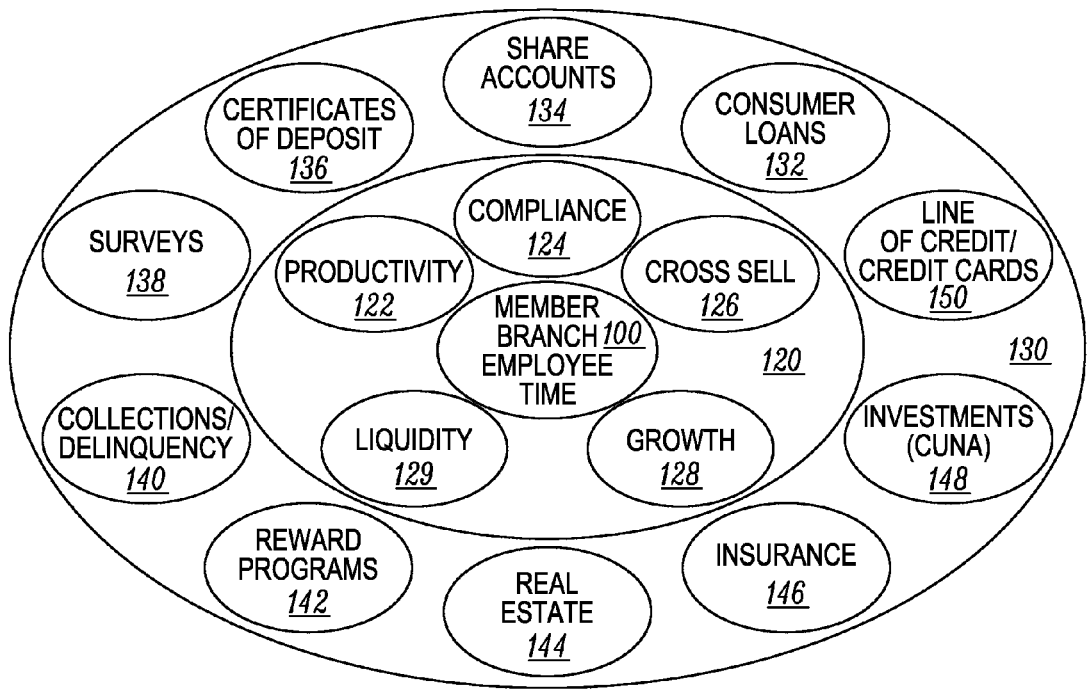
FIG. 1 illustrates a conceptual framework related to a data management system.

FIG. 1 illustrates a conceptual framework, which is advantageous for visualizing the advantages of an exemplary data management system and exemplary data model according to an aspect of the invention. As used herein, the term "entity" can refer, for example, to a data set or table in a data model. A central data entity group 100 includes central data group data entities containing attributes relating to member, branch, employee and time data and bears a central relationship to a number of external data entities 130. As will be explained below, the central data entity group 100 and external data entities 130 are integrated to enable robust and comprehensive reporting according to a number of reporting perspectives 120, which include productivity perspective 122, compliance perspective 124, cross-selling perspective 126, growth perspective 128 and liquidity perspective 129. The external data entities may include consumer loan data 132, share accounts data 134, certificates of deposit (CD) data 136, survey data 138, collections and delinquency data 140, reward and loyalty program data 142, real estate data 144, insurance data 146, investment data 148, which may include investments recommended by The Credit Union National Association (CUNA), which is a national trade association for both state- and federally-chartered credit unions located in the United States, and credit card data 150. As will be explained in more detail below, the data sets 130 are integrated in a manner that enables real-time, comprehensive reporting, analysis and insight in a customer- or member-, employee- and branch-centric manner over time.

Figure 2:
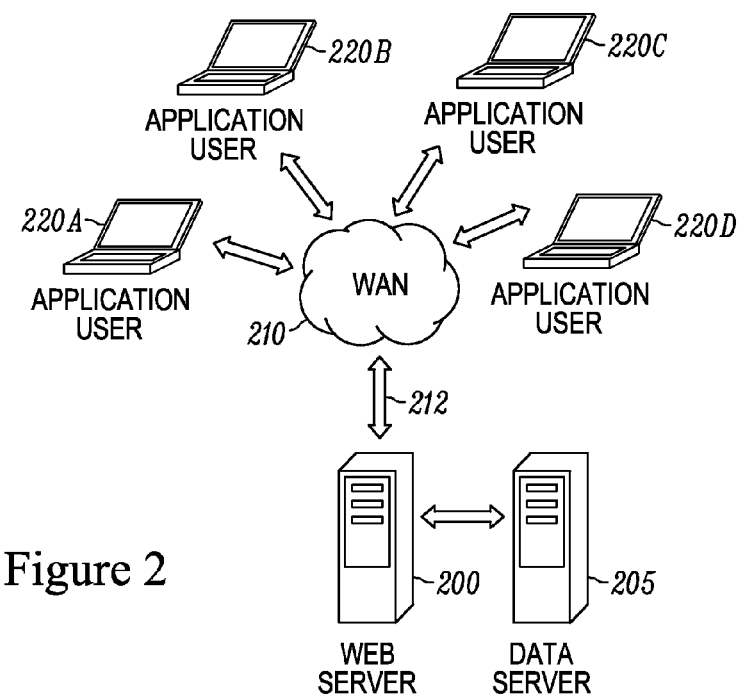
FIG. 2 illustrates a network environment suitable for implementing a data management system.

FIG. 2 illustrates a network environment suitable for implementing an exemplary data management system. A web server 200 is configured to access data from a data server 205 and communicates with a wide-area network (WAN) 210, via a network interface 212. A number of application user computers 220A-D may access functionality provided by applications running on the web server 200 via respective application user network interfaces 222A-D. Browser applications running on the application user computers permit users to access functionality provided by the web server, which functionality will be explained below. Users can view data according to reporting services on the web, such as Microsoft Reporting Services offered by Microsoft Corporation of Redmond, Wash.

Figure 3:
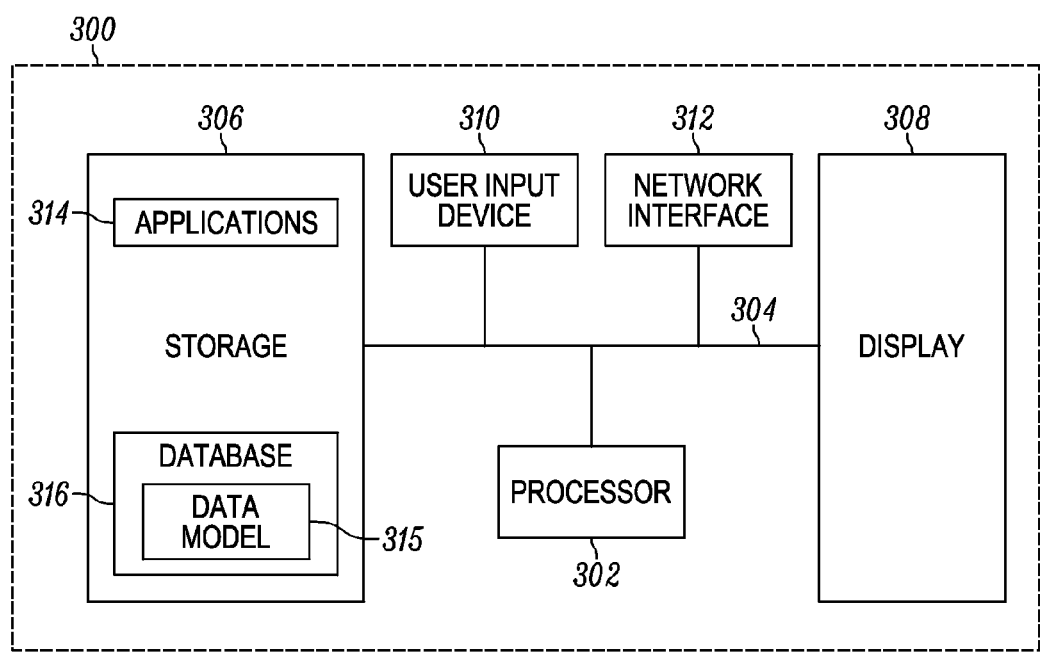
FIG. 3 is a functional block diagram of a computer environment suitable for implementing a data management system.

FIG. 3 illustrates elements of a computer platform 300 suitable for implementing a data management system according to an aspect of the invention. A processor 302 communicates via an electronic data bus 304 with a storage 306, display 308, user interface 310 and network interface 312. Processor 302 may execute instructions representing applications 314 in storage 306. Storage 306 also contains a data in a database 316 which may be structured according to a data model 315, as will be explained further below.

Figure 4:
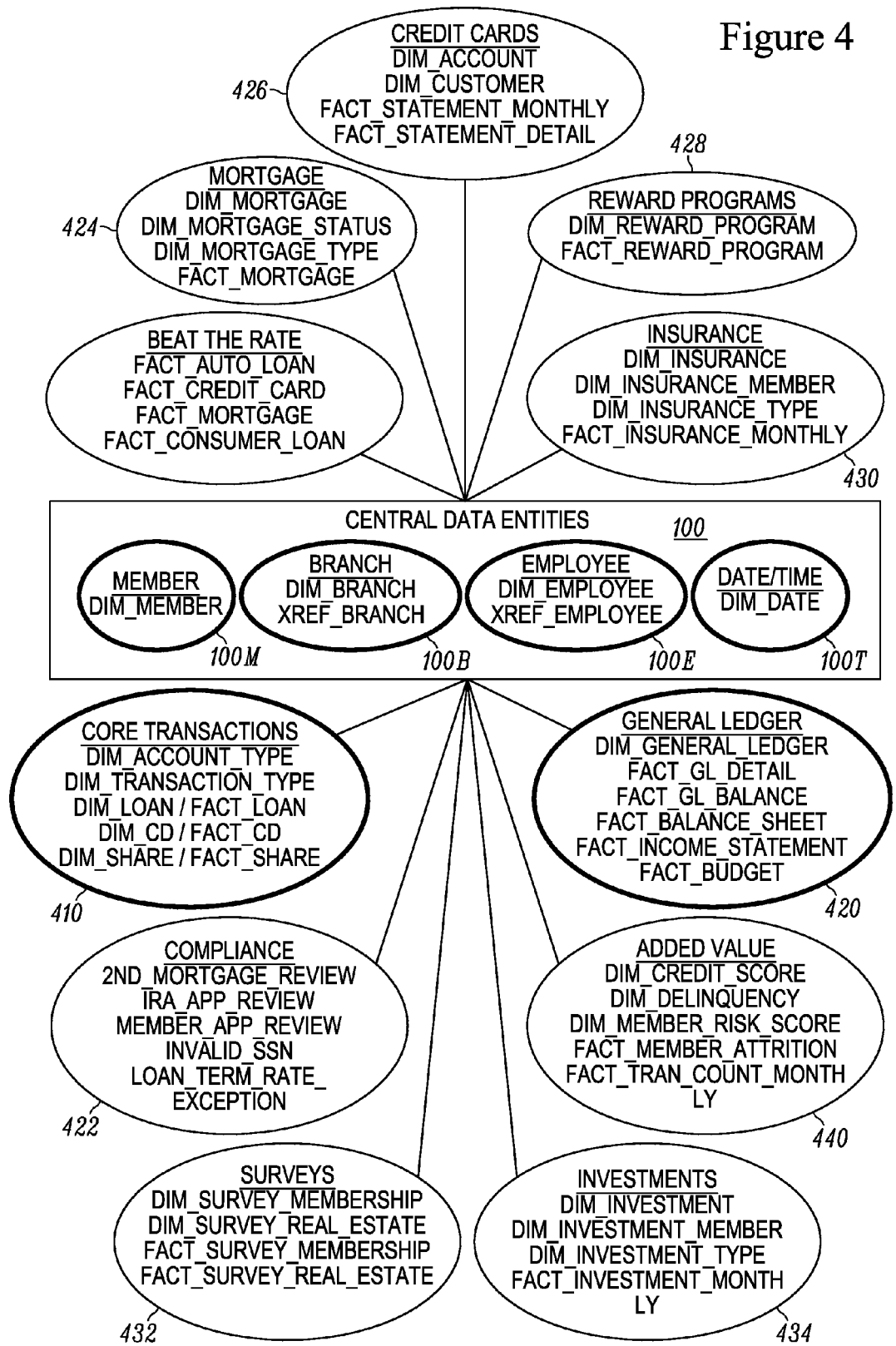
FIG. 4 illustrates the logical organization of an exemplary data model.

FIG. 4 depicts the high-level logical relationships between data entities in an exemplary data model according to one aspect of the invention. A central data entity group 100 includes a plurality of central data entity group entities, including a member data entity 100M, an employee branch data entity 100E, a branch data entity 100B, and a data/time data entity 100T. As will be recognized by those of ordinary skill, the entities may be represented as dimension tables in an exemplary data model. In accordance with the exemplary data model according to one aspect of the invention, the central data entity group 100 is logically related to all external data entities as described in further detail below.

Central data entity group 100 will typically include data which is sourced from one or more core systems of a financial institution, such as an Enterprise Resource Planning (ERP) system, and which is loaded into the common data entities using Extract, Transform and Load (ETL) techniques, as will be explained in more detail below. In FIG. 4, the shaded data entities represent data that is sourced from core systems. In addition to the central data entity group 100, a core transactions data entity 410 and a general ledger data entity 420 may also be sourced from data residing in the core systems.

Other data entities are related to the central data entity group 100, including a credit-union specific data entity 422, mortgage data entity 424, credit card data entity 426, reward programs data entity 428, insurance data entity 430, survey data entity 432 and investment data entity 434. Typically, these data entities will be developed from: 1) software applications (other than the core ERP system) within the financial institution; 2) source text file data from external vendors; or 3) manual unstructured data, such as Excel and Word documents, manually developed within an organization.

In accordance with an aspect of the invention, still referring to FIG. 4, one or more transformed data entities may be developed from existing external and/or internal data sources. The transformed data entities represent data that is a combination of data sets existing in different sources, or data that is computed from such data. As an example, a compliance data entity 422 may include second mortgage review data, individual retirement account (IRA) application review data, member application review data, as well as a flag representing whether or not the social security number associated with a member is valid or invalid. Similarly, there may be one or more added value data entities 440, which include credit score, delinquency, member risk, member attrition and monthly transaction count data, for example. These data represent data that does not exist in the sources but is developed from them. The added-value data entities 440 allow more robust reporting and allow the data to be analyzed along additional dimensions.

Figure 5A:
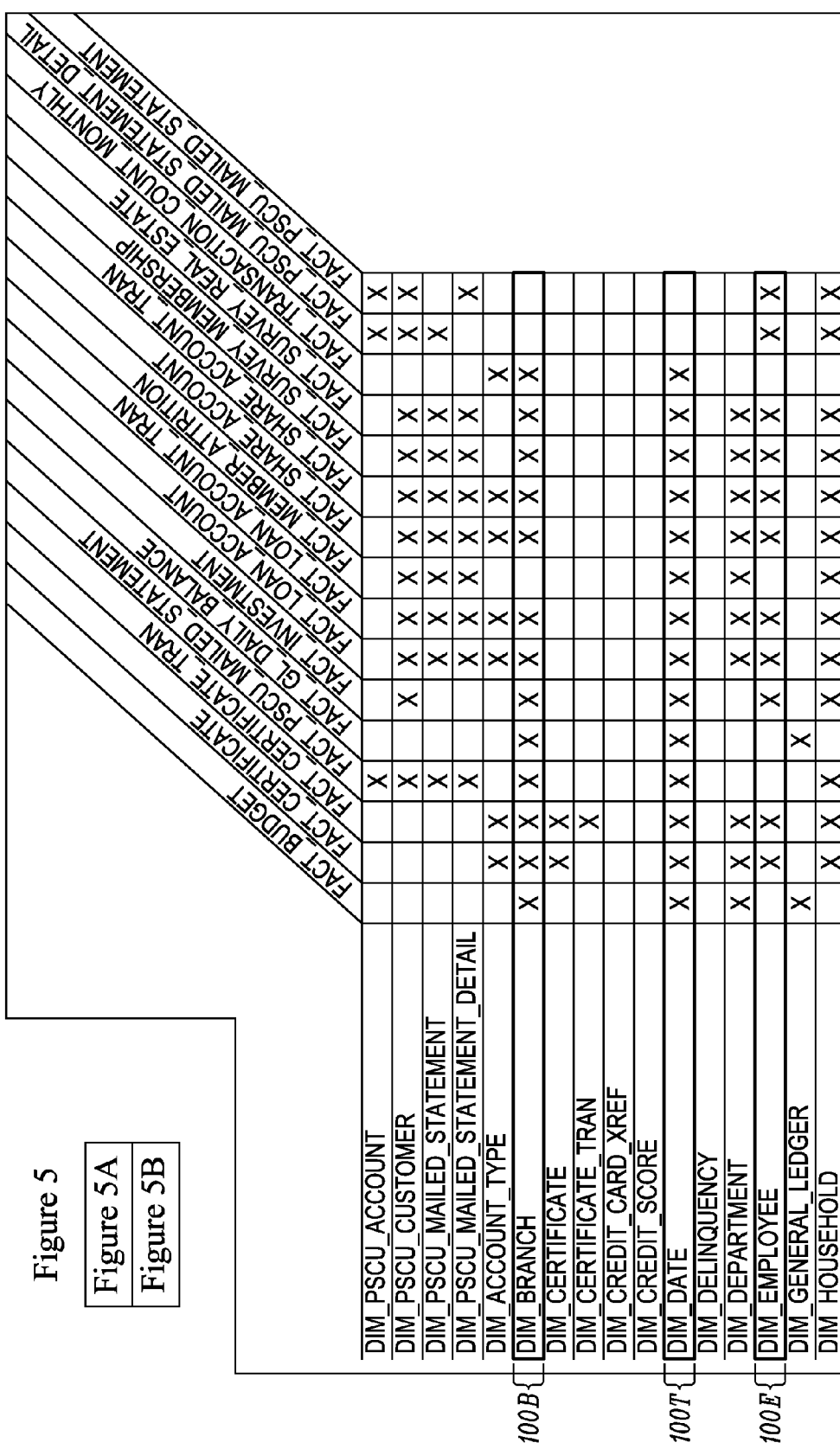
FIG. 5 is a matrix showing the relationships between data entities in an exemplary data model.

FIG. 5 illustrates a matrix showing relationships between data entities in an exemplary data model according to one aspect of the invention. As will be recognized, in accordance with an aspect of the invention, the dimension tables corresponding to the central data group data entities 100, DIM_BRANCH, DIM_EMPLOYEE, DIM_MEMBER and DIM_DATE are logically related, as denoted by an "X" in the matrix, to a number of fact tables represented in the columns in FIG. 5. The columns correspond to business process-related entities, which related to business products offered by a financial institution. For example, a FACT_BUDGET column corresponds to a budget product offered by a financial institution and the FACT_CERTIFICATE column corresponds to a certificate of deposit (CD) product offered by the financial institution. In accordance with an aspect of the invention, the central data group entities 100B, 100T, 100E and 100M are logically related to nearly all of the business product-related entities represented in the columns in FIG. 5. In this manner, the integration of the data sets is characterized by member-, branch- and employee-centricity. Each column in FIG. 5 represents a schema, as will be described in further detail below. As will be recognized, this overall data structure provides improved breadth, depth and data integration compared to prior art structures and systems.

Figure 6A:
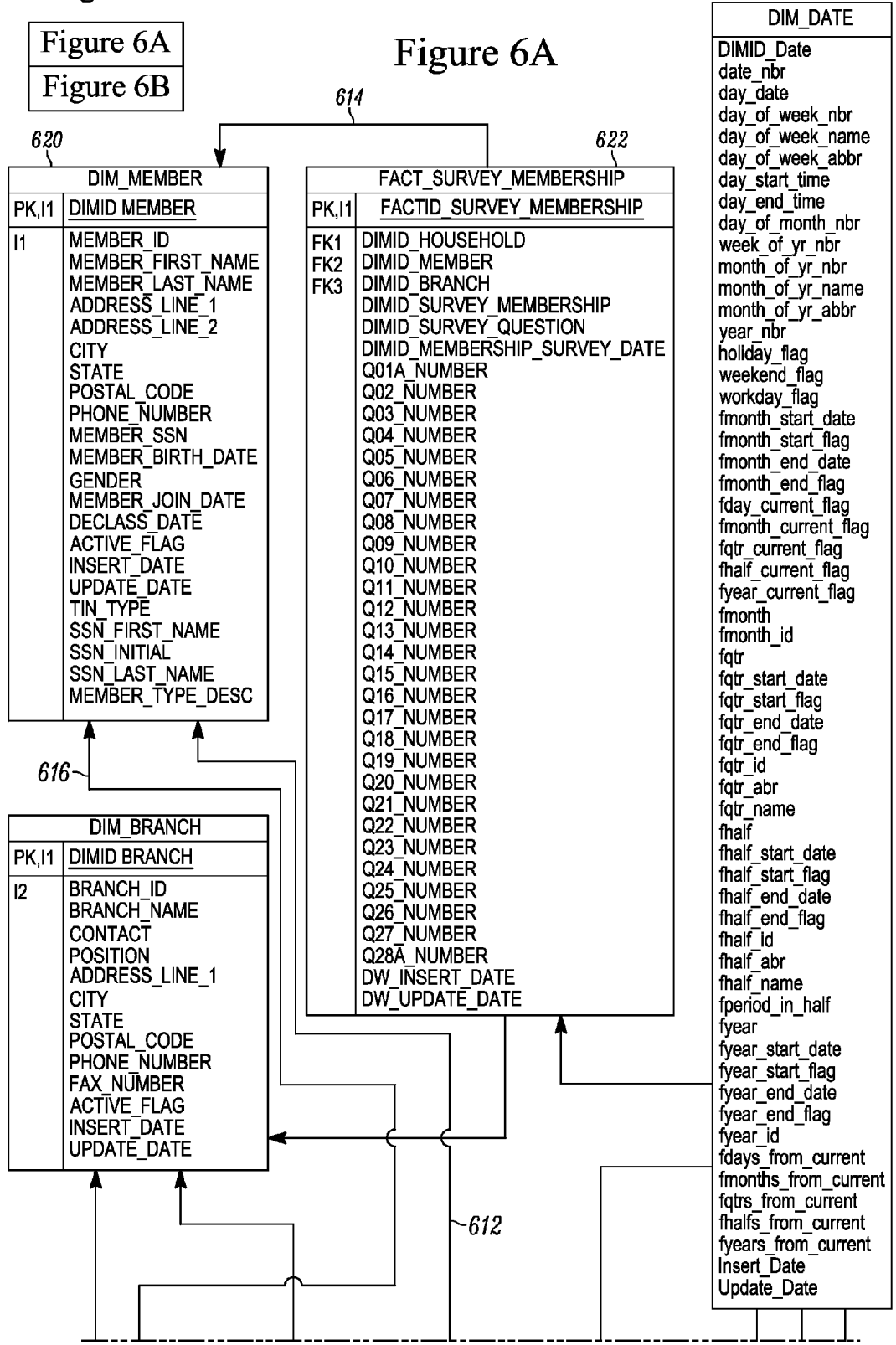
FIG. 6 illustrates the logical relationships between data entities for three distinct business processes (surveys, loans and investments) and the FACT_LOAN_ACCOUNT data entity in FIG. 5.
Figure 6B:
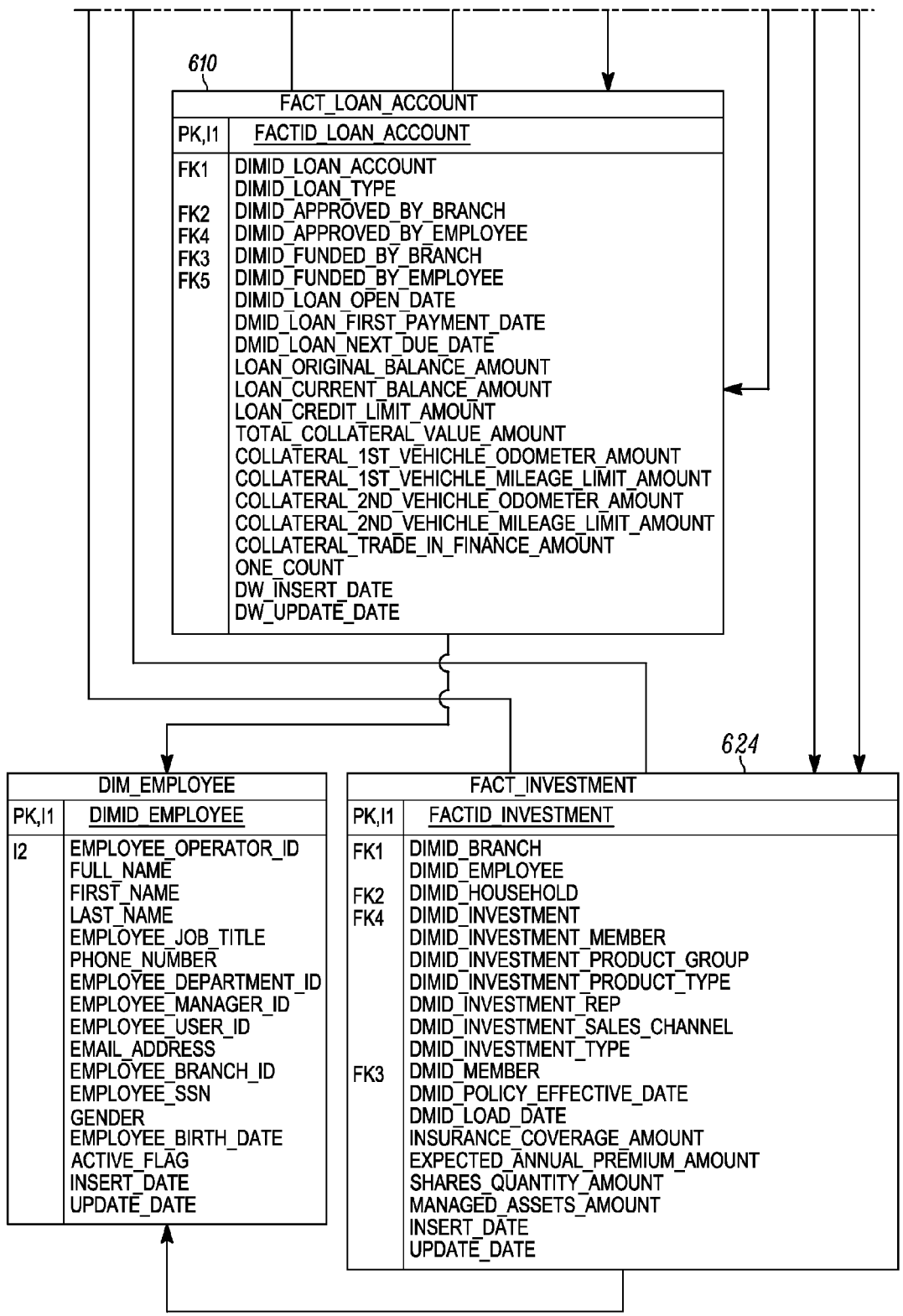

FIG. 6 illustrates exemplary logical relationships between data entities—fact and dimension tables—for the FACT_LOAN_ACCOUNT, FACT_INVESTMENT and FACT_SURVEY_MEMBERSHIP entities and the central data entities, DIM_DATE, DIM BRANCH, DIM_MEMBER and DIM_EMPLOYEE of FIG. 5. FIG. 6 also illustrates exemplary attributes for each data entity. The logical relationships may be implemented using known relational database principles, which may include the use of foreign and primary keys, denoted "FK" and "PK" in the illustrated model. It will be recognized that similar logical structures are implemented according to the logical relationships denoted in FIG. 5, for each of the listed fact and dimension tables. FACT_LOAN_ACCOUNT entity 610 is logically related via one logical connection 612 to DIM_MEMBER entity 620, which also has logical connections 614 and 616 to FACT_SURVEY_MEMBERSHIP entity 622 and FACT_INVESTMENT data entity 624, respectively. As will also be recognized, this exemplary structure and the degree of logical connections between data entities enables more breadth and depth in reporting and analysis of loan account and other information than was previously provided in the prior art. This exemplary structure also lends itself to ease-of-use via multiple business intelligence reporting software, such as Microsoft Reporting Services, SAP Business Objects and IBM Cognos, among others.

Figure 7B:
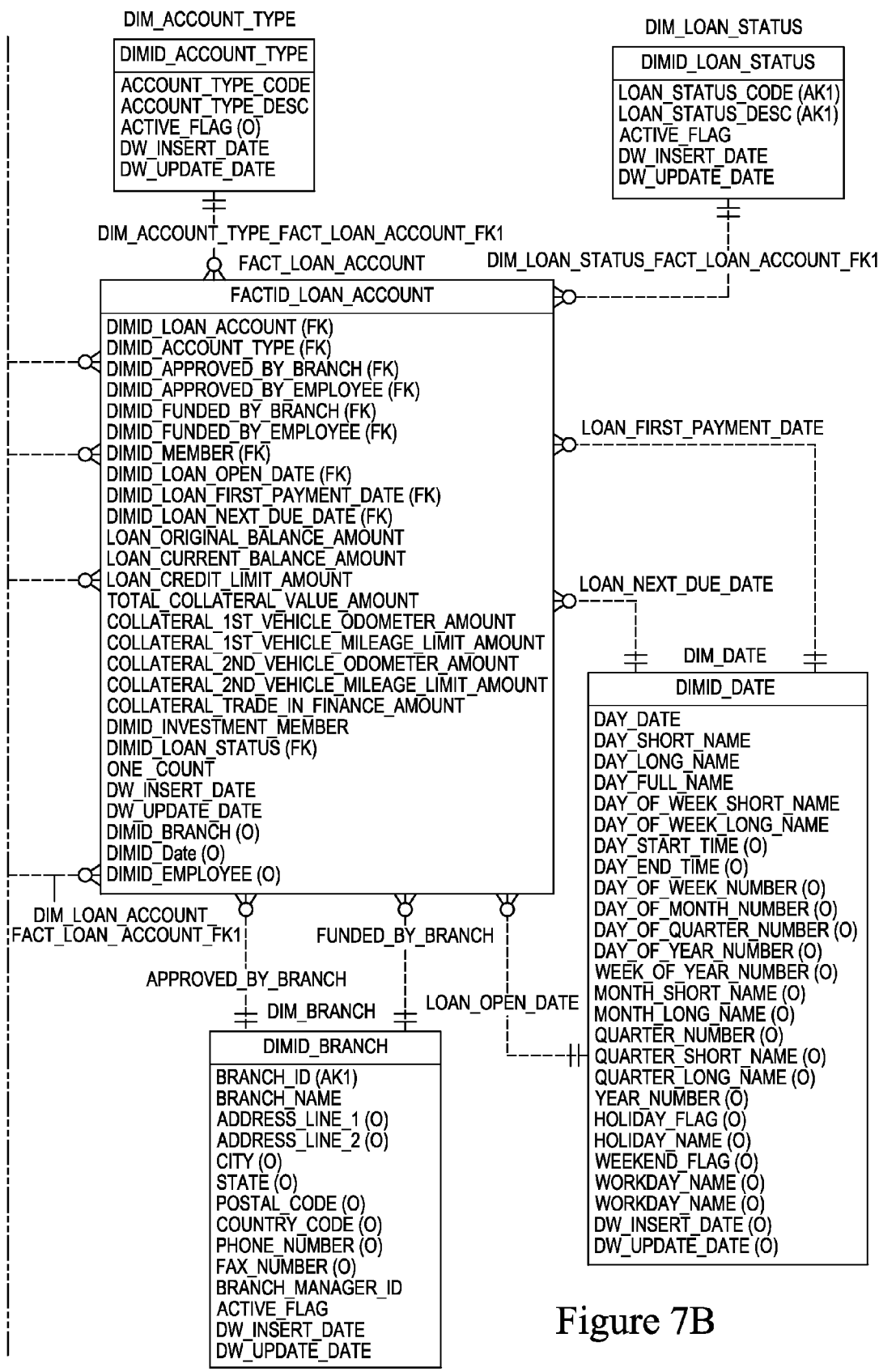
FIG. 7 illustrates an exemplary schema for the FACT_LOAN_ACCOUNT data entity of FIGS. 5 and 6.

FIG. 7 illustrates an exemplary schema for the FACT_LOAN_ACCOUNT fact table and related dimension tables. As will be recognized, two logical relationships exist between FACT_LOAN_ACCOUNT and DIM_EMPLOYEE, providing for reporting and analysis based on the APPROVED_BY_EMPLOYEE dimension as well as the FUNDED_BY_EMPLOYEE dimension. Other relationships between data entities are readily apparent from FIG. 7. Thus, the exemplary data structure enables quick and efficient reporting of all information tied to a particular loan account or member. For example, loan account information may be analyzed according to three different date dimensions: first payment date, next due date and loan open date.

Figure 8:
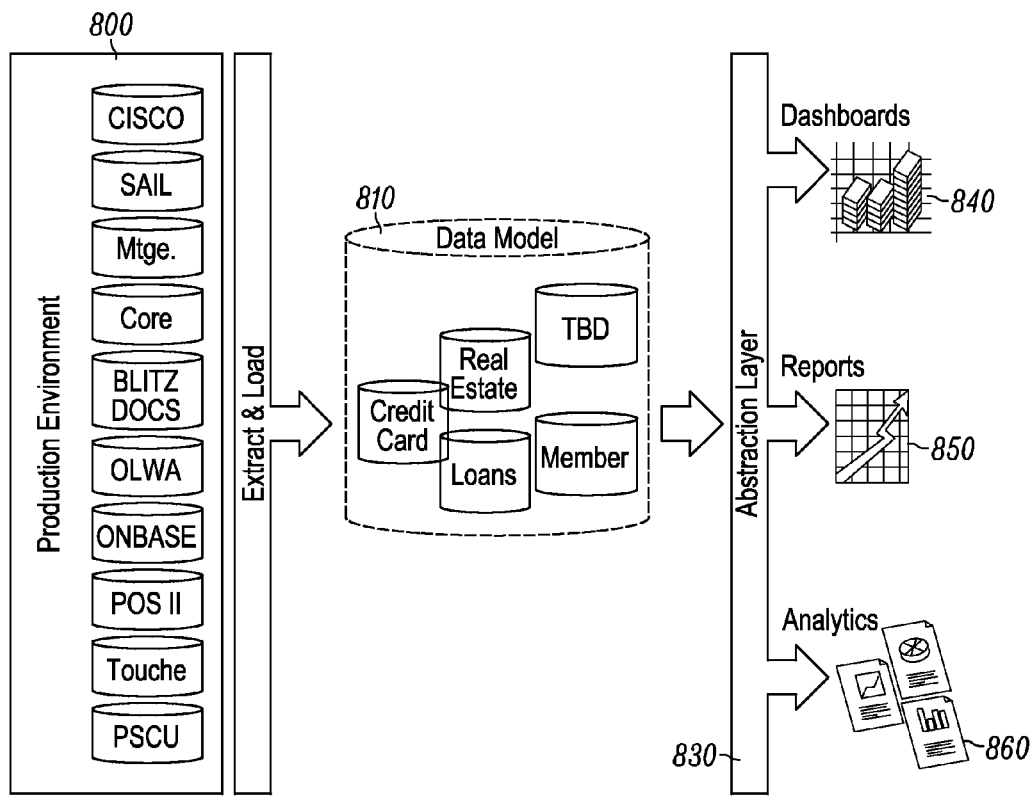
FIG. 8 illustrates an extract, transform and load (ETL) process according to an aspect of the invention.

FIG. 8 illustrates the general extract and load process for creating a data model according to an aspect of the invention and demonstrates an overall data flow from source systems to an exemplary data model, to reporting and analytics delivered automatically to business consumers. Construction of the data model may be done by using known Extract, Load and Transform (ETL) tools for pulling data from core systems and/or external system sources in a production environment 800. Such may be accomplished using standard data warehousing tools, such as Microsoft SQL Server Integration Services. In accordance with an aspect of the invention, transformations may be performed on the source data to enable enhanced reporting capabilities as will be explained in more detail below. The resulting data model 810 may be accessed via an abstraction layer 830 to provide support for dashboards 840, reports 850 and analytical tools 860.

Figure 9:
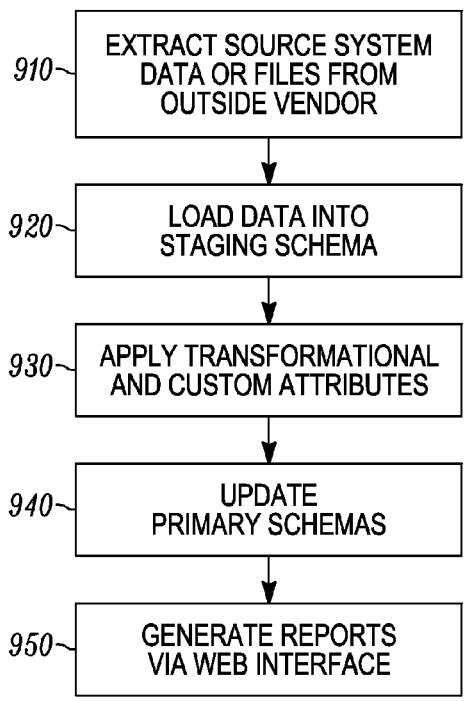
FIG. 9 illustrates an exemplary process of developing and using a data model according to an aspect of the invention.

FIG. 9 shows the general steps performed in a process for creating and using a data model according to the invention. At step 910, data is extracted from source and external systems. At step 920, the extracted data is loaded into a staging schema. At step 930, transformations may be performed as well as custom attributes added to the data entities in the staging schema. At step 940, the primary schemas are updated using data from the staging schemas and the data model is constructed. At step 950, reports are generated using a web or other interface. These general steps will be explained in further detail with regard to three exemplary scenarios for creating a data model according to an aspect of the invention.

Figure 10:
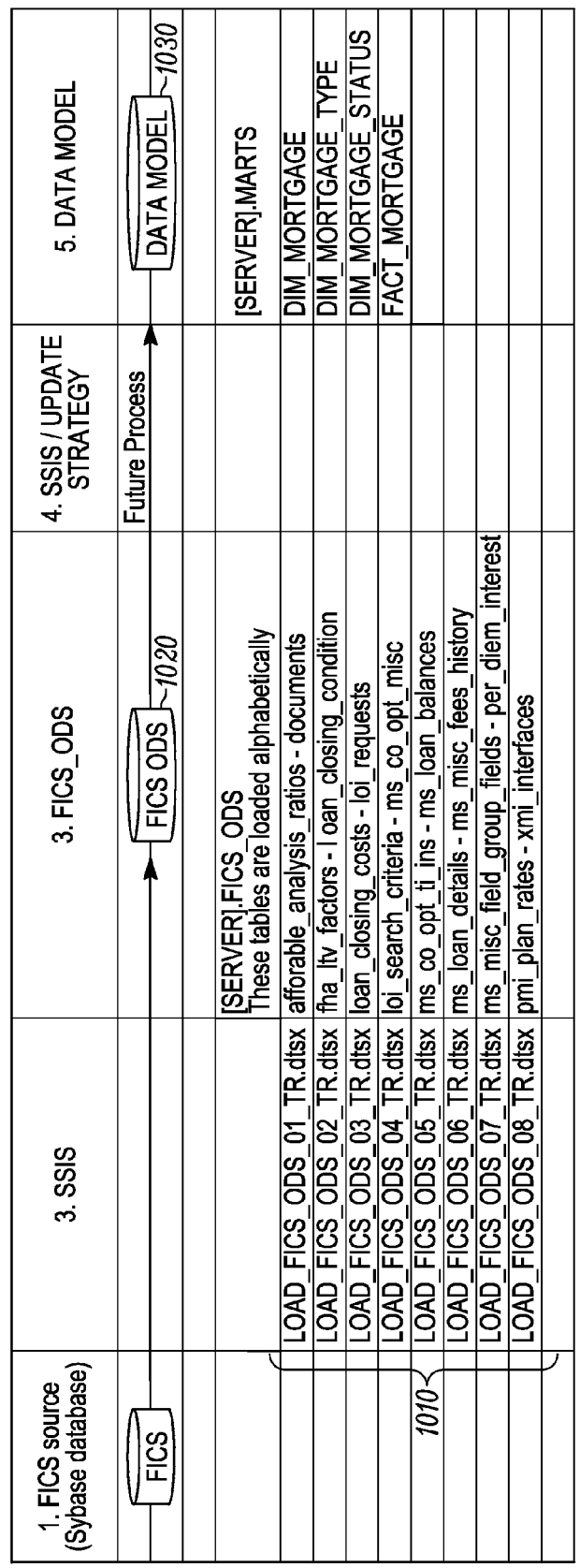
FIG. 10 illustrates an exemplary process of developing a data model directly from a data source that is internal to a credit union or other financial institution.

A first example of a data model creation process is depicted in FIG. 10. In this example, data originates in an internal system at a credit union or other financial institution in which the data source is directly accessible. In this case, the source data is provided by Financial Industry Computer Systems, Inc. (FICS) of Dallas Tex., and includes mortgage loan servicing data in a Sybase database. According to the invention, the first step of extracting source system data (910 in FIG. 9) and loading data into a staging schema (920 in FIG. 9) is implemented as a series of load instructions or "packages" 1010 executed within SQL Server Integration Services (SSIS) provided with Microsoft Integration Services platform for building data integration solutions. The staging schema, 1020, denoted "FICS_ODS" in FIG. 10 may comprise hundreds of tables containing mortgage-related data and may be populated on a periodic basis using truncate and reload commands. From the staging schema 1020, SSIS is then again used with appropriate transformations and inclusion of custom attributes, using appropriate load and transform commands, and updates to the primary schema (step 940 in FIG. 9) are performed to create the data model 1030, which includes data entities and logical relationships as explained above.

Figure 11A:
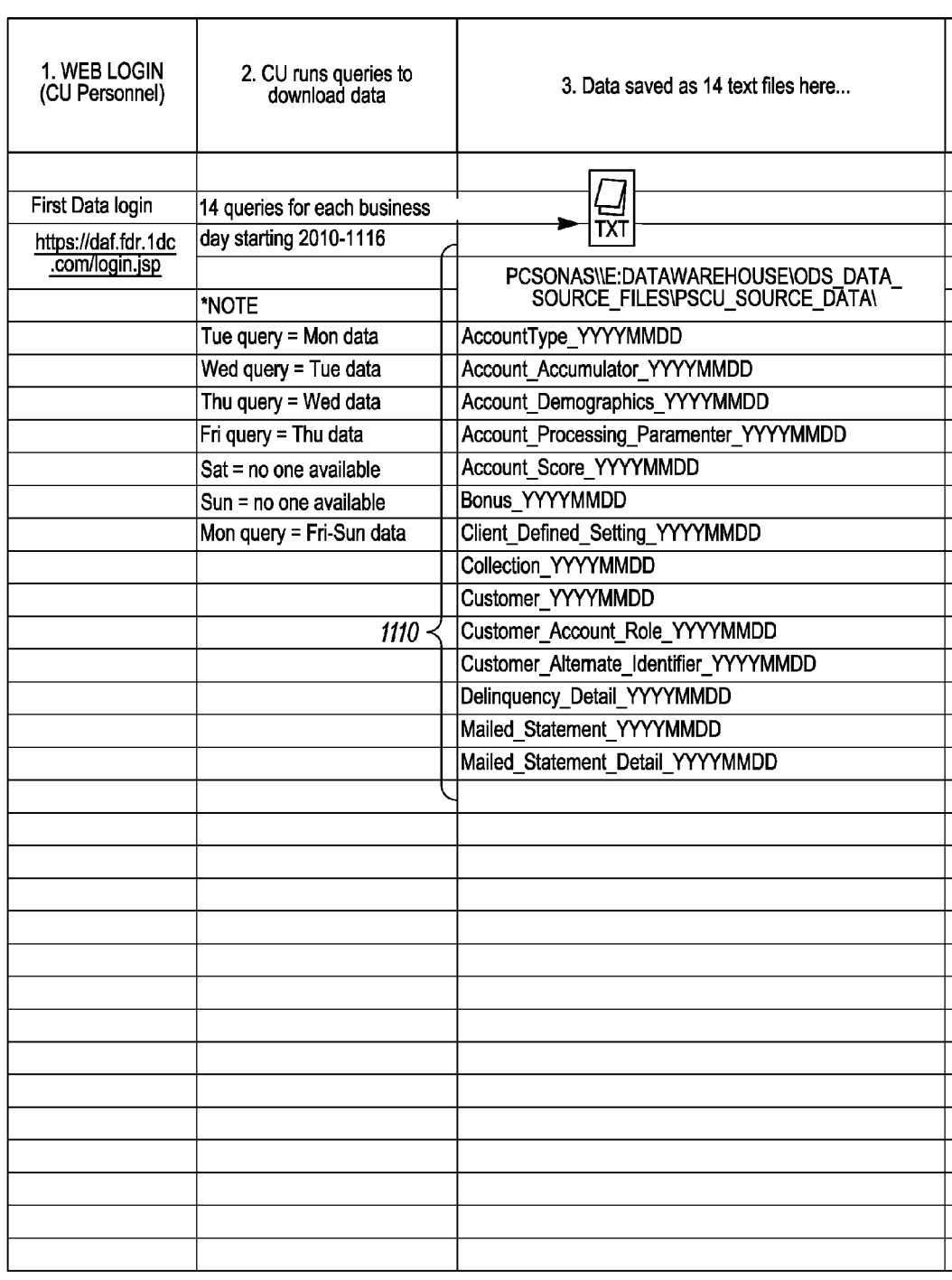
FIG. 11 illustrates an exemplary process of developing a data model from a data source that is external to a credit union or other financial institution.
Figure 11B:
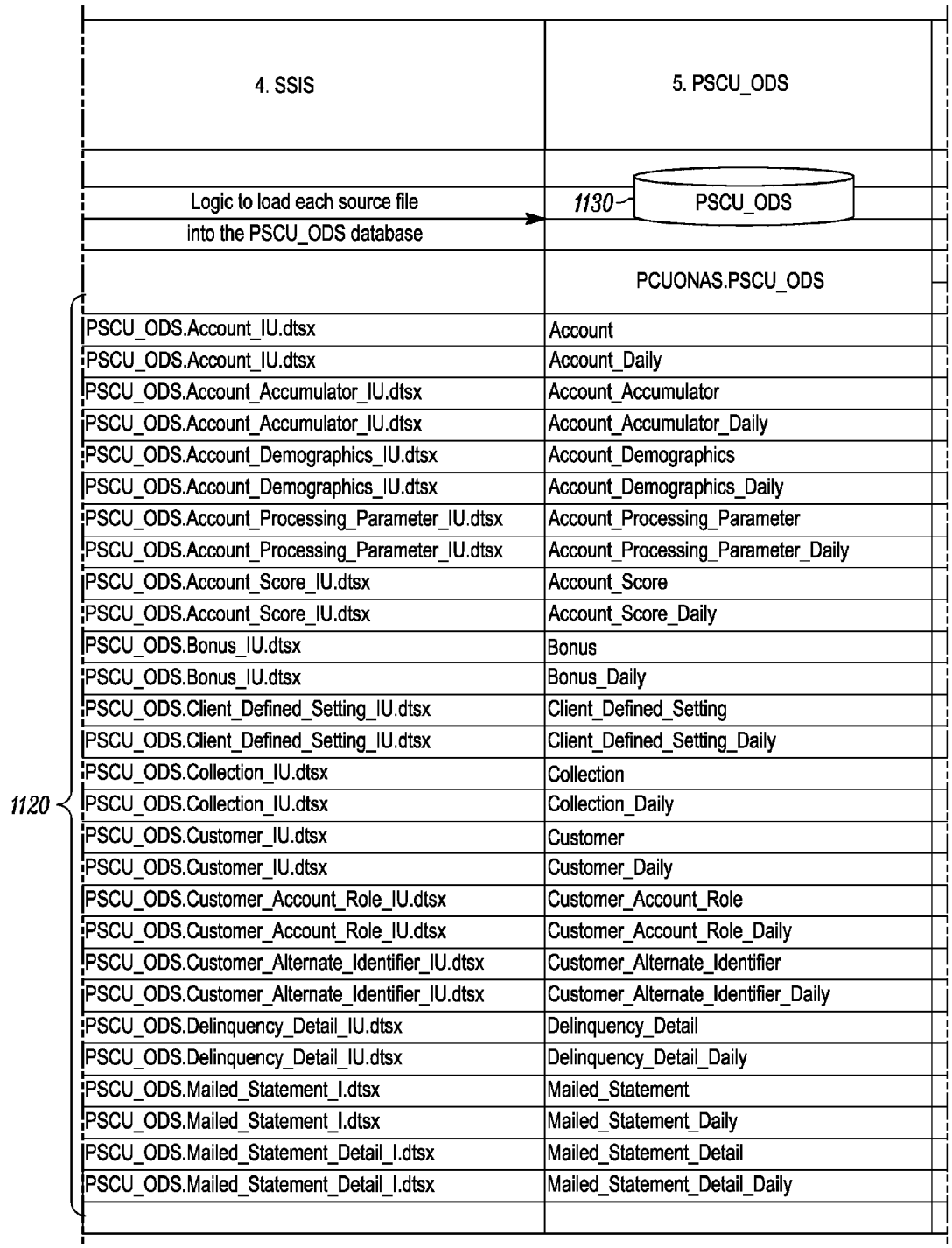

FIG. 11 depicts another example in which source data originates from an external vendor to a credit union, or other financial institution. In this case, the external data is first accessed by internal employees and then made available for further processing. Here, credit union employees must login to a website and execute a number of queries to create a number of text files 1110, for example ".csv" delimited text files. According to an aspect of the invention, SSIS packages 1120 are executed to create tables in a staging schema 1130. Then SSIS "Load" commands are executed on the staging schema tables to create the updated primary schemas in the data model. 1140.

Figure 12A:
FIG. 12 illustrates an exemplary process of developing a data model from a core internal system of a credit union or other financial institution.
Figure 12B:
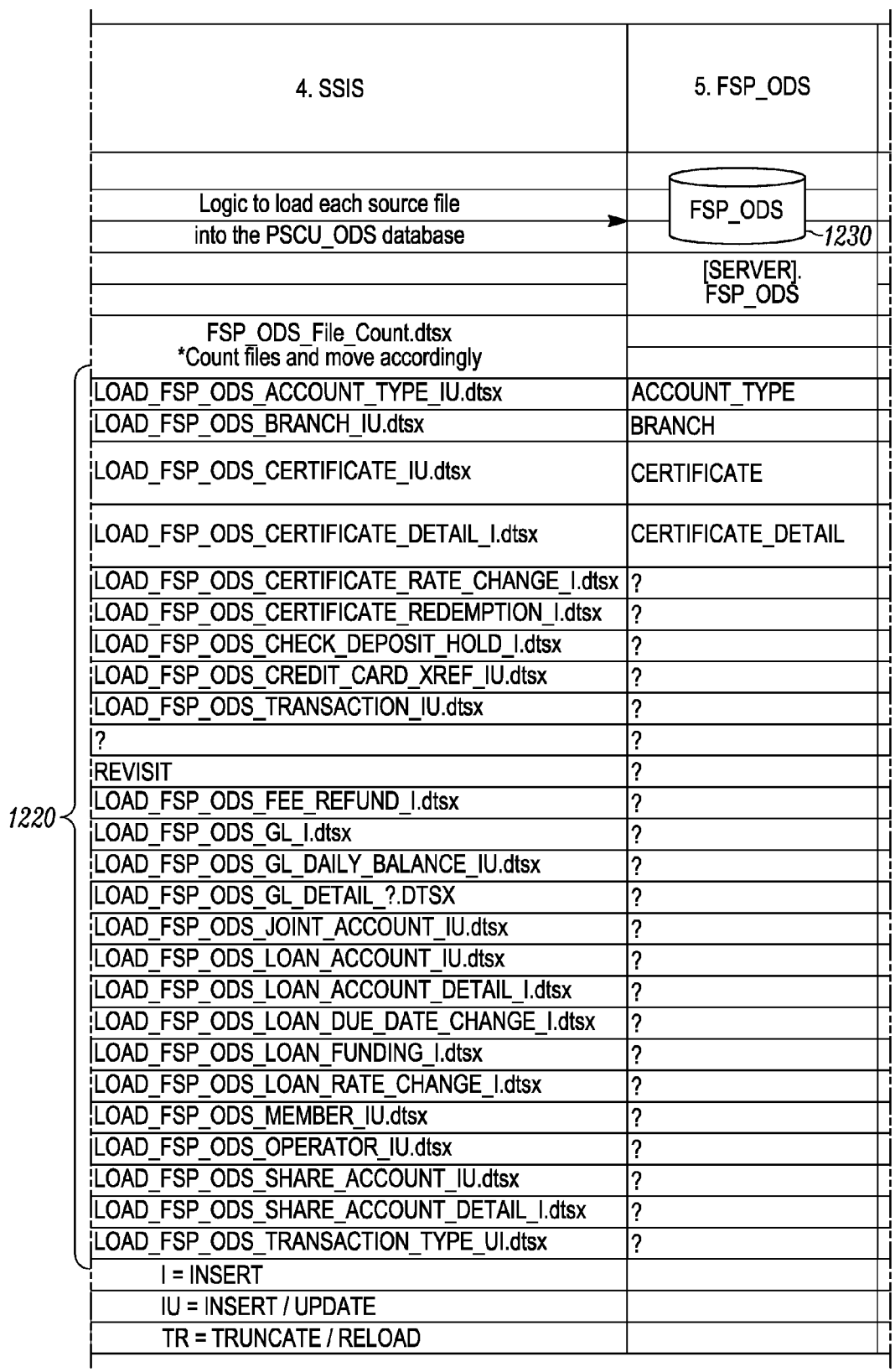

FIG. 12 illustrates another example in which the source data originates in an internal database that does not lend itself readily to SQL queries. In this case, an automated process performs daily extractions on the data from the FSP and saves the data in a number of, in this case 26, text files, 1210. In accordance with an aspect of the invention, a series of load packages or instructions 1220 are performed on the text files to create tables in a staging schema 1230. Further load instructions 1240 are performed on the staging schema tables to create the data model 1250.

FIG. 13 illustrates attributes that are suitable for supporting the automation capabilities of a data management system according to the invention. A member active flag attribute is included in the DIM_MEMBER dimension table as also shown in FIG. 6, to enable quick determination of member status, such as active or inactive. Date attributes, including member join date and member birth date are provided in the DIM_MEMBER data entity in order to identify both calendar and fiscal dates for member-related events. An account code/description attribute and a transaction type/description attribute are provided to enable faster and more efficient identification of text descriptions related to numeric codes that may be present in source data.

FIG. 14 illustrates transformations that are performed as part of step 930 in FIG. 9 to the source data in order to support enhanced automation capabilities of a data management system according to the invention. These attributes are included in data entities in the data model to facilitate faster and more efficient reporting and indexing capabilities. A MEMBER NUMBER/CODE/ID transformation operates to provide consistent data types in the target data entity. More specifically, the data type, such as text, character or number data type, for member numbers may be different across different source systems. This transformation converts the data into a consistent data type in the target data entity.

The NULL VALUES/UNKNOWN ROW transformation type addresses transaction tables with missing data, such as missing data for branch, employee or date attributes. The NULL VALUES/UNKOWN ROW transformation assigns an "UNKNOWN" value to an attribute with missing data. This transformation ensures that all records are returned when a query, such as a SQL query, is performed on the data, even for data where data was missing in the source data.

The NULL $ AMOUNTS transformation also provides improved accuracy of queries performed on the data. This transformation assigns a zero value in cases where amount data is a NULL value in the source data. Thus, for queries that are related to averages or counts, for example, accuracy will not be compromised by the presence of NULL values in the source data. The LAST MONTH, LAST YEAR BALANCES transformation improves reporting performance by eliminating multiple runs of SQL or other queries on the data. This transformation calculates and stores as an attribute the last month and last year balances within the same data row. The NEW COLUMNS transformation enables a user to identify the exact source location for a data record. This transformation adds a new column to the data which includes the source file name. The NEW TABLES transformation enables customer-defined ranges and more flexible reporting options. The SSN CLEANUP transformation provides for the consistent display of social security number data.

Figures 15A, 15B:
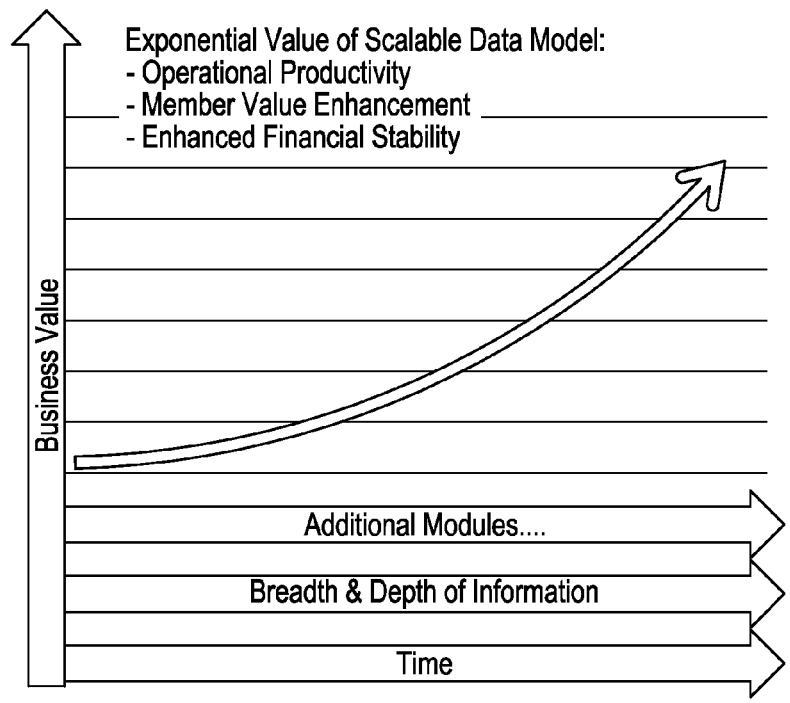
FIGS. 15A and 15B illustrate aspects of a modular architecture for a data management system according to the invention.

FIGS. 15A and 15B illustrate aspects of a modular architecture for a data management system according to a further aspect of the invention. A number of reporting modules are provided as a core module 1210, loan module 1220, credit card module 1230, credit bureau module 1240, each of which provides additional reporting and analytic capabilities to the end user or customer. In addition, one or more additional modules 1250 may be provided for additional reporting or analytic capabilities. According to the invention, a user may increase the reporting capabilities provided by the data management system by incrementally adding modules. Thus, a basic reporting installation may include only the core module, which enables reporting based on the member, branch, employee and time data entities in the data model. The loan module 1220 and additional modules may be added by the user at a later date in order to provide additional reporting based on delinquency category, share account type and loan account type data entities within the data model. As will be recognized, when a loan module 1220 is added, it is not necessary to update or modify the data model with logical connections to delinquency category, risk category or product category, for example, since those logical connections already exist within the data model.

Referring additionally to FIG. 15B, the modular architecture and data model according to aspects of the invention provide for exponentially increasing business value to the customer with the expansion of the data management system with additional modules. As the system is expanded with additional modules, the breadth and depth of information that is accessible increases.

FIG. 16 illustrates a user interface in accordance with an aspect of the invention. A compliance dashboard includes a number of zones on the display representing commitments to members, opportunities 1620, compliance/exceptions 1630 and other assignments 1640.

Figure 17:
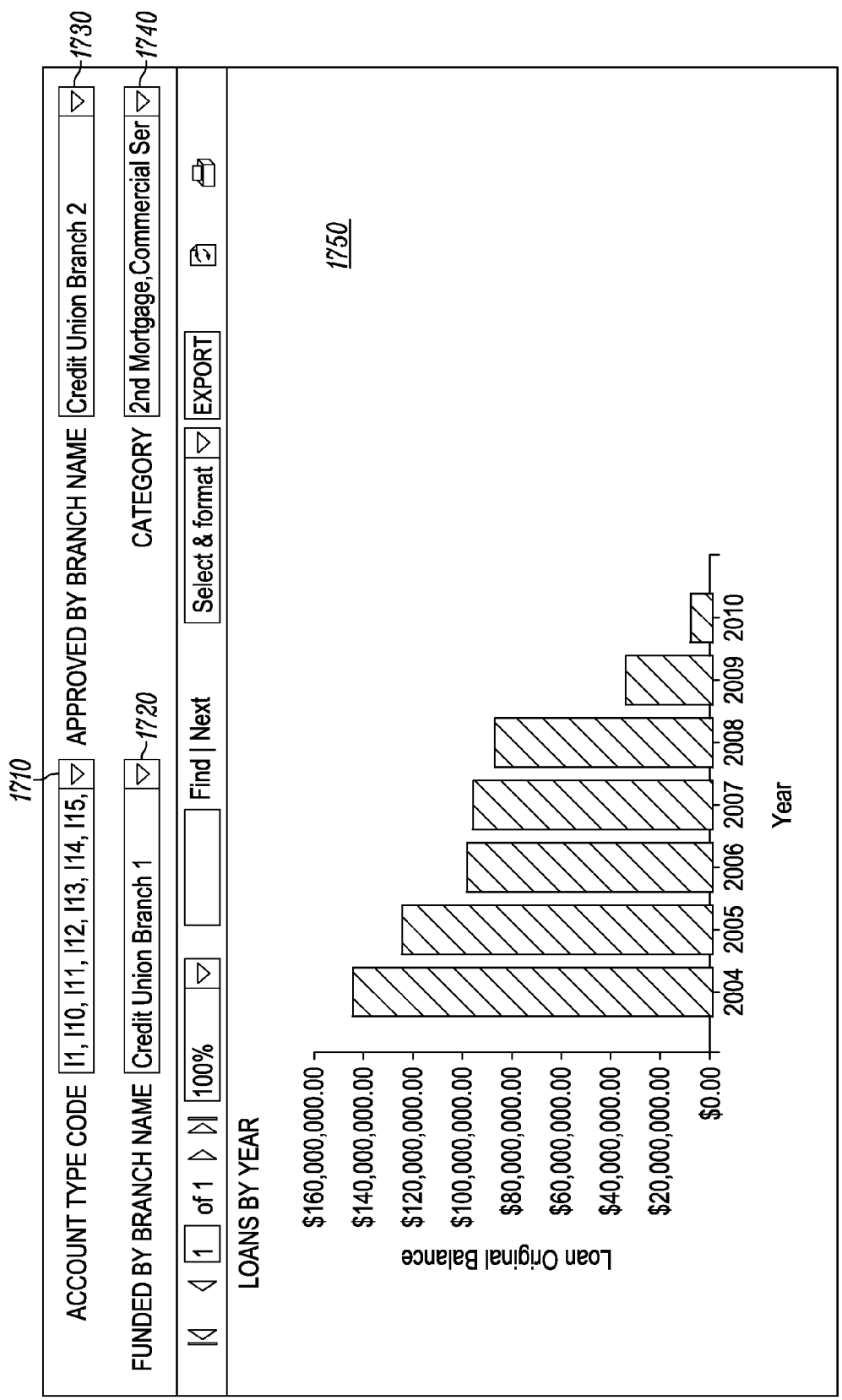

FIG. 17 illustrates a user interface for reporting and analysis of loan data according to an aspect of the invention. The interface includes controls for enabling the user to select an account type code 1710, funded by branch name 1720, approved by branch name 1730 and category 1740. The controls may be in the form of a pull down menu or text entry box. Loan information is displayed in a display region 1750 and may include graphic data depicting the value of loans over a time increment, such as a yearly increment. As will be appreciated, the level of reporting and analysis of loan data is more comprehensive than prior art systems due to the advantages provided by the underlying data model as described above.

FIG. 18 illustrates a further user interface showing a loan detail report accessible from the user interface screen in FIG. 17. Here an additional control 1810, which permits the user to specify a "report day", allows for the display of loan data for loans opened on a selected day, with a number of loan-related attributes displayed in a table format.

FIG. 19 illustrates a member insight reporting interface enabled by an exemplary data model according to an aspect of the invention. An attrition by day report may be accessed by a user navigating through an appropriate link 1910. Data showing member additions and losses for each day within a selected range is shown in display region 1920. As will be recognized, each of the dates displayed in the "date" column in the displayed data may be an active link, which enables the user to click on the link and view more detailed attrition data for a given day.

Figure 20:
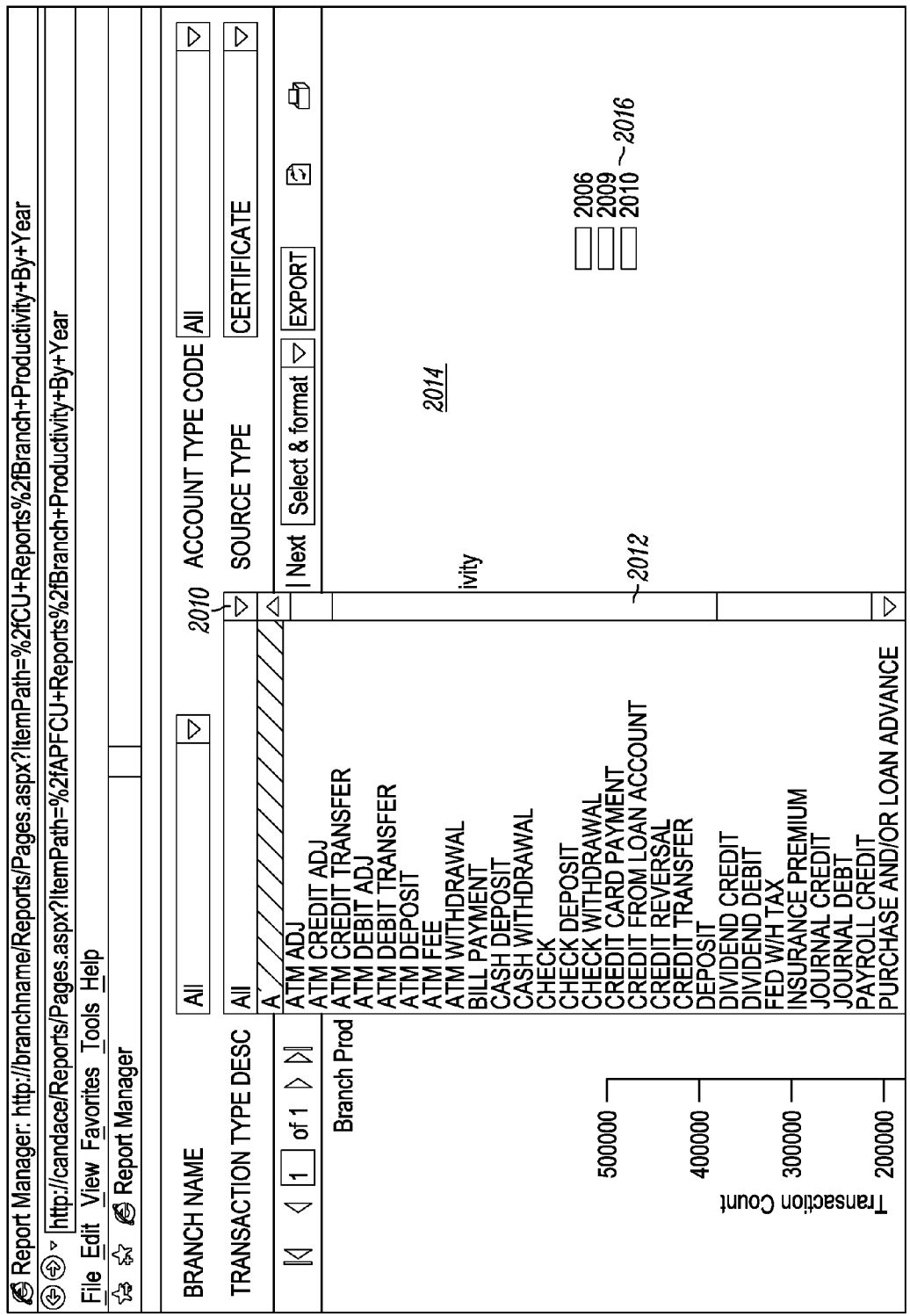

FIG. 20 illustrates a productivity insight reporting interface enabled by an exemplary data model according to an aspect of the invention. A transaction type description control 2010 activates a pull-down menu 2012 to permit a user to select from a number of transaction types for which reporting is desired, including an "all" transactions designation which is shown selected. The selected data may be displayed in a display region 2014 in a graphical format, such as a bar chart, with an appropriate legend 2016 denoting different colors for different years of the displayed branch productivity transaction count.

What is claimed is:

1. A data management system for member-centric reporting and analysis of data for credit unions, comprising:
   a non-transitory computer-readable medium for storing data and instructions;
   a processor for executing the instructions stored in the computer-readable medium;
   the data having a credit union data structure including:
   a) a member dimension table defining a plurality of attributes that characterize each member of the credit union;
   b) a branch dimension table defining a plurality of attributes that characterize each branch of the credit union;
   c) an employee dimension table defining a plurality of attributes that characterize each employee of the credit union;
   d) a plurality of credit union business product data entities defining a respective plurality of credit union business products available to credit union members; each credit union business product data entity including at least one fact table containing data representing values that characterize the respective corresponding credit union business product; the credit union business product data entities including:
   i) a share account product entity, having a share account product fact table representing values associated with a share account product;
   ii) a credit card product entity, having a credit card fact table representing values associated with a credit card product;
   iii) a loan product entity, having a loan product fact table representing values associated with a loan product;
   iv) a certificate product entity, having a certificate product fact table representing values associated with a certificate product;
   v) an insurance product entity, having an insurance product fact table representing values associated with an insurance product;
   vi) an investments product entity, having an investments fact table representing values associated with an investment product;
   vii) a general ledger entity, having a general ledger fact table representing values associated with general ledger activity; and
   viii) a surveys entity, having a member survey fact table representing values associated with member survey activity;
   generating a data model containing a matrix defining the relationship between the member dimension table, branch dimension table and employee dimension table and logical connection to substantially all of the fact tables to enable member-centric, branch-centric and employee-centric reporting and analysis of the business-product related data;
   the instructions, when executed, causing the processor to perform the steps of:
      extracting source data from at least one source database of the credit union;
      loading the source data into a schema adapted to the credit union data structure;
      applying transformational attributes to the source data to cause the data to be structured according to the credit union data structure; and
   an interface, including a display and a user input device for permitting user interaction with the data management system, the interface, processor and data structure adapted to generate reporting and analysis of the credit union data according to different reporting perspectives, including at least two or more of an employee productivity perspective, risk and compliance perspective, cross-selling perspective, member growth and attrition perspective and loan risk and pricing perspective.

2. The data management system of claim 1, further comprising a time data entity.

3. The data management system of claim 1, wherein the business product data entities include a reward data entity.

4. The data management system of claim 1, wherein the business product data entities include a compliance data entity and wherein the compliance data entity is created as a transformed data entity.

5. The data management system of claim 1, wherein the business product data entities include at least one added value data entity.

6. The data management system of claim 1, wherein the business product data entities include entities relating to credit score, delinquency, member risk, member attrition, monthly transaction count.

7. The data management system of claim 1, wherein the member dimension table includes attributes related to member status.

8. The data management system of claim 1, further comprising at least one transformed data entity for facilitating automation, the at least one transformed data entity including attributes relating to member identification number, social security number, missing data designation, source file name, or delinquency range.

9. The data management system of claim 2, wherein the data structure enable reporting perspectives for compliance, cross-selling, growth, liquidity, collections/delinquency and surveys based upon the branch dimension table, employee dimension table, member dimension table and time data entity.

* * * * *